350-6.8 SR
XR 3,573,849

United States

[11] 3,573,849

[72] Inventors Donald R. Herriot
Morris Township, Morris County;
Kenneth M. Poole, Bernardsville; Alfred
Zacharias, Plainfield, N.J.
[21] Appl. No. 796,456
[22] Filed Feb. 4, 1969
[45] Patented Apr. 6, 1971
[73] Assignee Bell Telephone Laboratories, Incorporated
Murray Hill, Berkeley Heights, N.J.

[54] PATTERN GENERATING APPARATUS

11 Claims, 8 Drawing Figs.

[52] U.S. Cl. 346/108, 350/7, 350/286, 250/237, 356/106, 178/6.7
[51] Int. Cl. G01d 15/14
[50] Field of Search 346/108, 107; 350/6, 7, 285, 286; 356/106; 178/6.7; 250/237

[56] ited

UNITED STATES PATENTS

| | | | |
|---|---|---|---|
| 3,154,371 | 10/1964 | Johnson | 346/108 |
| 3,389,403 | 6/1968 | Cottingham et al. | 346/108 |
| 3,441,949 | 4/1969 | Rolon | 346/108 |
| 3,475,760 | 10/1969 | Carlson | 346/1 |

*Primary Examiner*—Joseph W. Hartary
*Attorneys*—R. J. Guenther and Arthur J. Torsiglieri

ABSTRACT: Stored data representative of a pattern or image to be reproduced modulates a writing light beam that is reflected by a rotating mirror structure to scan a photosensitive medium. A coding beam scans a code plate in synchronism with the writing beam to generate a code signal used for controlling modulation of the writing beam. A scanning lens having a nonuniform focal length is used to make the linear scan velocity of the writing beam more uniform. An interferometer may be used to drive a refracting plate in the writing beam path to compensate for errors in the movement of the photosensitive medium.

3573849
OR IN 346/108

INVENTORS D. R. HERRIOTT
K. M. POOLE
A. ZACHARIAS
BY
Roderick B. Anderson
ATTORNEY

PATTERN GENERATING APPARATUS

BACKGROUND OF THE INVENTION

This invention relates to reproducing apparatus, and more particularly, to apparatus for generating patterns from information stored in a computer or similar storage apparatus.

The fabrication of semiconductor integrated circuits requires the repeated projection of light through different masks onto a semiconductor wafer coated with a photosensitive layer. After each exposure and appropriate development, the layer itself then constitutes a mask for permitting selective processing of the wafer, such is etching and diffusion.

The photolithographic mask pattern may be prepared by a draftsman and then photographically reduced to a size more appropriate for production of the actual mask. As mask patterns become increasingly complex and dimension tolerances more exacting, more skillful pattern design and more expensive photographic reduction equipment is required to make the desired mask.

Because the photolithographic masks comprise only transparent and opaque regions, it has been proposed that the mask pattern be described by digital information; that is, by a train of stored electrical pulses or "bits" each representing successive spots on a mask pattern that are either transparent or opaque. For example, a positive pulse or a 1 bit may represent a transparent spot, while the absence of a pulse, or a 0 bit, may represent a transparent spot, while the absence of pulse, or a 0 bit, may represent an opaque spot. The stored information may then be used to drive any of various kinds of facsimile recorders to reproduce the desired mask pattern. Another advantage of this approach is that, with new computer techniques, the computer itself may actually design the desired mask configuration as well as store the information representative of it.

Once the digital information has been stored, the pattern could, in theory, be reproduced in a number of ways such as by using the information to modulate a scanning electron beam as in conventional television reproduction. Our investigation has shown, however, that such conventional techniques are not capable of the high resolution or precision required for reproducing the extremely fine detail of certain photolithographic masks.

SUMMARY OF THE INVENTION

It is an object of this invention to provide apparatus capable of high resolution reproduction of patterns represented by stored electrical information, and more specifically, to provide apparatus capable of generating photolithographic mask patterns.

We have found that a scanning light beam, particularly one formed by a laser, may be modulated by stored information and focused to an extent sufficient to give precise and relatively high resolution reproduction within a reasonably small time period. A rotating polygonal mirror comprising a circular arrangement of mirror facets is used, in a known manner, to cause the light beam to scan a photosensitive medium. It is important, of course, that the modulating information be synchronized with the scan of the light beam; this would normally be difficult to accomplish with the required accuracy because the rotating mirror is driven by an electrical motor.

In accordance with one feature of our invention, the light beam is initially separated into two components, a writing beam that records the desired information on the photosensitive medium, and a coding beam that synchronizes modulation of the wiring beam with the position of the writing beam. Both of these beams are projected toward the rotating polygonal mirror in a plane parallel to the axis of rotation such that they scan in synchronism. While the writing beam is directed onto the photosensitive medium, the coding beam is reflected through a code plate having alternately transparent and opaque regions, each representative of a successive scan location. The coding beam light transmitted through the code plate is detected by a photodetector as a train of pulses which is transmitted as a code signal to a control circuit where each pulse of the code signal releases a corresponding information bit for modulating the writing beam. As a result, each information bit modulates the writing beam at a proper point of the scan regardless of spurious variations of scanning velocity.

Even though the code beam synchronizes modulation and scanning, operation efficiency is preferably optimized by making the linear velocity of the writing beam, as it scans the photosensitive medium as uniform as reasonably possible. Since any conventional motor drives the rotating mirror at a substantially constant angular velocity, the linear scan velocity across a flat photosensitive medium would, in the absence of any modification be nonuniform. Compensation for this effect is made by including a distorting lens between the rotating mirror and the photosensitive medium in the writing beam path. To give proper distortion resulting in a uniform linear scan velocity, the focal length of the scanning lens should be proportional to $\theta/\tan\theta$, where $\theta$ is the angle between the lens' optic axis and the reflected writing beam. The scanning lens also gives uniform focusing of the writing beam on the photosensitive medium over the entire scan.

The writing and coding beams are most conveniently made to be of circular cross section. Experience has shown, however, that, with high resolution requirements, it is often difficult to make the code plate sufficiently free of defects because the widths of the opaque and transparent regions are necessarily so small. However, we have found that the effects of such code plate defects can be substantially eliminated by using a ribbon shaped coding beam and by making the opaque and transparent regions in the shape of stripes each parallel to the plane of the coding beam. This increases the area of coding beam impingement to reduce the effect of random small area defects.

The photosensitive medium is mounted on a table that can either be stepped to a new position after each scan, or moved continuously. The combination of a precise stepping motor and a high precision lead screw may provide sufficiently accurate control of successive positions of the table. In either case, however, an interferometer may be used to monitor table movement and detect deviation from its desired position. The interferometer output is transmitted to a computer which generates an analog signal indicative of the direction and extent of deviation. The analog signal is detected by a galvanometer which drives a refracting plate in the writing beam path to deflect the writing beam by an amount sufficient to compensate for the deviation of the photosensitive medium. In the continuous drive case, the analog signal is preferably also used to control a slow servo motor that drives the table.

The extent to which the facets of the polygonal mirror are precisely symmetrical, and the extent of tolerable rotation deviations of the mirror also depend on the required resolution. It can be appreciated that, as tolerances become more exacting, the expense of fabricating polygonal mirror structures and the number of structures rejected are undesirably increased.

In accordance with another feature of the invention, fabrication complexities are reduced by using roof reflector prisms instead of mirror facets in the polygonal mirror structure. As is known, roof reflectors comprise two reflecting surfaces arranged at right angles such that incoming light is reflected from both reflecting surfaces. Each roof prism may be made separately and if any intolerable defects occur, only a single reflector prism is discarded, rather than the entire polygonal mirror structure. The various prisms may then be mounted on the cylindrical polygonal mirror structure, and it can be shown that the tolerance of the prisms to misalignment is larger than that of planar mirror facets. Moreover, the prism structure is capable of tolerating larger rotational deviations than the multifaceted planar mirror structure.

These and other objects, features and advantages of the invention will be better understood from a consideration of the following detailed description taken in conjunction with the accompanying drawing.

DETAILED DESCRIPTION

Figure 1:
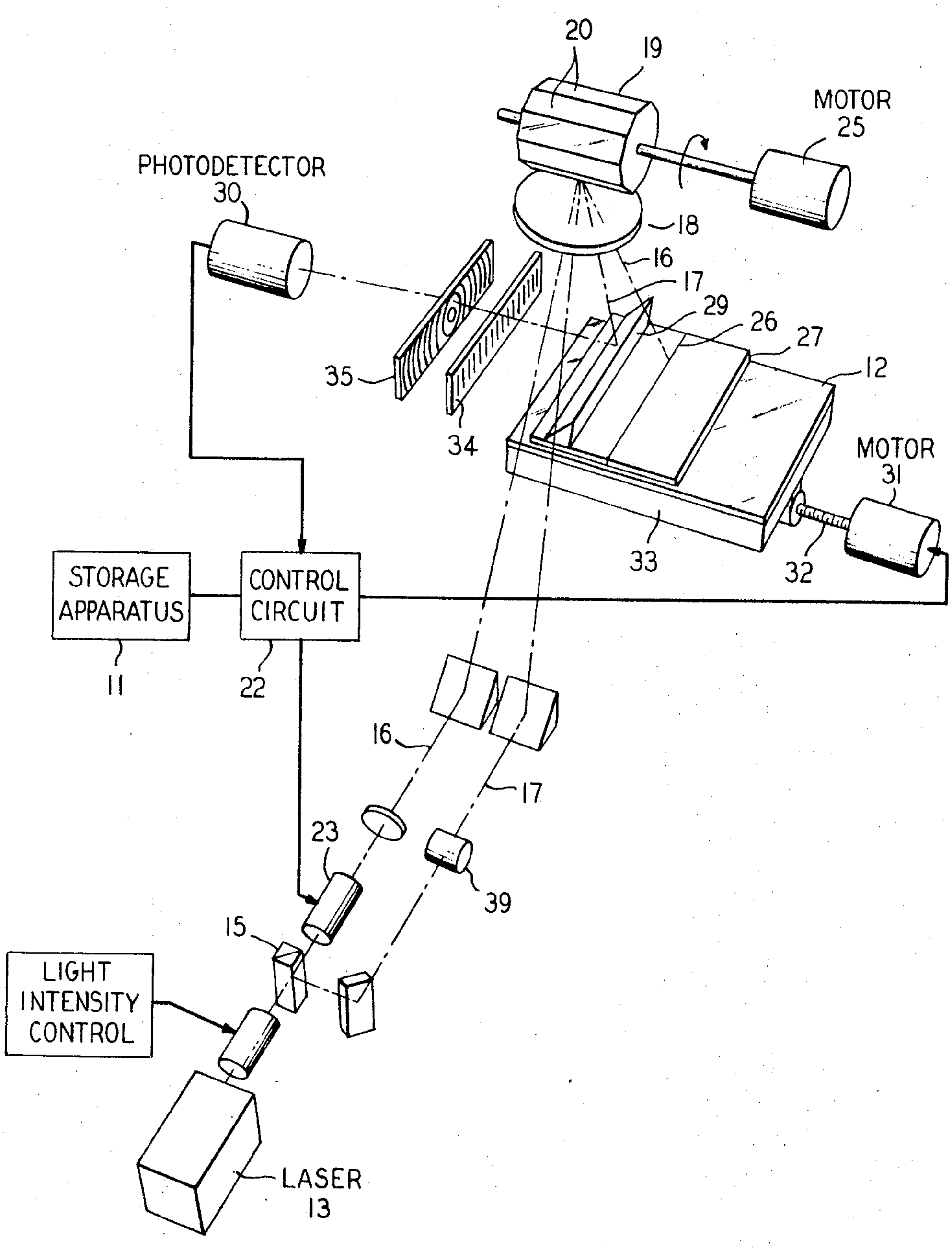
FIG. 1 is a schematic illustration of an illustrative embodiment of the invention.

Referring now to FIG. 1 there is shown a schematic illustration of a pattern generator for reproducing the image of a pattern which is stored as electronic data by storage apparatus 11 on an appropriate medium such as magnetic tape. The pattern to be generated consists only of transparent and opaque regions and, therefore, may be represented by digital data; for example, a positive voltage pulse or a 1 bit represents a transparent spot to be reproduced, while a 0 bit, or the absence of a pulse, represents an opaque spot. The information is eventually reproduced on a photographic plate 12 which is exposed to light generated by a laser 13. A beam splitter 15 divides light from the laser into a writing beam 16 and a coding beam 17 which are both directed through a scanning lens 18 onto a rotating polygonal structure 19 comprising a plurality of mirror facets 20.

A control circuit 22 periodically causes electronic data from storage apparatus 11 to be transmitted to an optical modulator 23, where it intensity modulates the writing beam 16. Since the modulating information is digital, it may be used simply to switch the beam off and on; for example, a 1 bit may cause the writing beam to be obstructed, while a 0 bit permits the writing beam to be transmitted through the modulator 23 without obstruction.

The rotating mirror structure 19 is driven by an electrical motor 25, and as it rotates, successive mirror facets 20 are presented to the writing and coding beams. Since each mirror facet revolves about an axis of rotation, the angle of reflection of the coding and writing beams constantly changes, causing the reflected beams to scan or sweep through a prescribed angle until a successive mirror facet is presented to the light beams. The writing beam 16 is directed through a slit 26 in a mask 27 onto the plate 12, and thereby periodically scans the photographic plate. The coding beam 17, on the other hand, is intercepted by a mirror 29 which directs the coding beam toward a photodetector 30.

A stepped motor 31 periodically moves the photographic plate 12 with respect to the scanning writing beam 16. The motor 31 is advantageously actuated by a signal from control circuit 22. That is, after that quantity of information required for modulating the light beam during a single scan has been transmitted by the control circuit to the optical modulator 23, the scan is completed, and a signal is sent to the motor 31 which causes a lead screw 32 to be rotated such as to advance a table 33 supporting the photographic plate 12 to a position appropriate for receiving the successive scan of the writing beam. Appropriate apparatus maintains mask 27 in a stationary position so that writing slit 26 is always exposed to the scanning beam.

In operation, serially stored data representative of one scan of the photographic medium is directed to the optical modulator 23 as the writing beam 16 commences a single scan. After completion of this scan, motor 31 is actuated to advance the photographic plate, and a new train of information is transmitted to the modulator as the writing beam commences its successive scan. It is, of course, important that the input modulation information be synchronized with the scanning of the writing beam, not only to assure that modulation begins at the commencement of each scan, but also to assure that each quantum of information, or bit, modulates the writing beam during the proper part of the writing beam scan. This is necessary because, among other reasons, spurious velocity variations of the rotating mirror structure 19 may be intolerably large in a high resolution system.

The purpose of the coding beam is to maintain proper synchronism between the writing beam modulation and writing beam scan such that each information bit modulates the writing beam at precisely the proper instant with respect to writing beam scan. The coding beam 17 and the writing beam 16 are projected toward the rotating mirror 19 in a plane which is parallel to the axis of rotation of the mirror such that at any instant they are reflected at a common angle from a mirror facet and thereby scan in synchronism. As the writing beam scans the photographic plate, the coding beam is reflected from mirror 29 to scan a code plate 34 comprising a succession of alternately opaque and transparent strips. The coding beam is then focused by a lens 35, which may be a Fresnel lens, onto the photodetector.

Figure 2A:
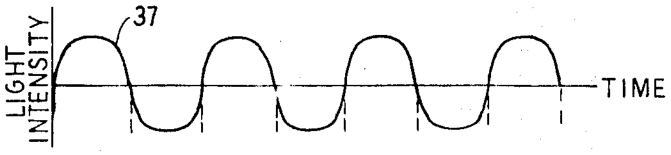
FIG. 2A is a graph of the intensity of light impinging on the photodetector of FIG. 1 versus time.

Because of the variable transmission through the code plate, the light intensity impinging on the photodetector varies with time as shown by curve 37 of FIG. 2A, and the photodetector releases an electrical coding signal to the control circuit 22 having substantially the same waveform as that shown by curve 37. The width of the opaque and transparent strips of code plate 34 are arranged such that they each correspond to a location at which a single bit of writing beam information is transferred to the photographic plate by the scanning writing beam. Accordingly, the control circuit 22 is designed such as to release a single bit of information to the optical modulator 23 in response to one voltage pulse from the photodetector.

Figure 2B:
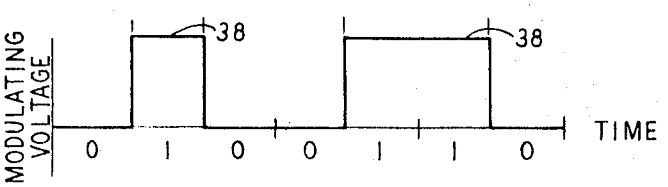
FIG. 2B is a graph of a typical portion of the digital output of the computer of FIG. 1.

This function is illustrated by the graph of FIG. 2B which illustrates the time relationship of information pulses 38 with the coding pulses of curve 37. For example, the first positive pulse of curve 37 releases a 0 bit to the optical modulator, while the successive negatively extending pulse releases a 1 bit to the modulator. Thus, if there is some variation in scanning velocity of the writing beam, the coding beam scanning velocity will be similarly varied, curve 37 on FIG. 2A will be varied, and the information transmitted to the writing beam modulator will be maintained in synchronism with the writing beam scan.

The design of the control circuit 22 to accomplish the functions described is well within the ordinary skill of a worker in the art and will not therefore be described in detail. The circuit may typically comprise a shift register containing a train of information pulses which is gated by each pulse of the coding signal to release an information bit to the modulator. Appropriate counter and a "buffer store" device may be used for controlling transmission of the information from the storage apparatus 11 to the shift register. The stored information may contain an appropriate signal indicating the termination of each line of scan which may be used to actuate the stepped motor 31; alternatively, appropriate counters may be used for generating an actuating signal after the completion of each scan. A general purpose computer may be programmed, in a manner which would be apparent to one skilled in the art, to accomplish the above functions, as well as other functions, such as error detection and correction, and providing a visual display from which the pattern generation can be monitored.

Even though the coding beam synchronizes modulation and scanning, operation efficiency of the system is preferably maximized by making the linear scan velocity of the writing beam across the photosensitive medium as uniform as reasonably possible. In the absence of scanning lens 18, the scanning velocity of the writing beam on the photographic plate 12 would be substantially constant only if the plate were a curved surface having its center curvature at the axis of rotation of the mirror. However, with a proper scanning lens 18, the linear velocity of the writing beam on the photographic plate is substantially constant even though the plate is flat.

Figure 3:
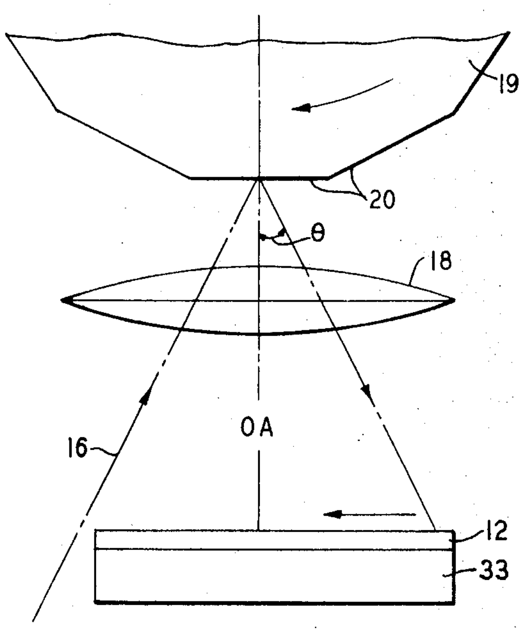
FIG. 3 is a schematic illustration of the scanning lens of FIG. 1.

Referring to FIG. 3, $\theta$ designates the angle between the reflection of writing beam 16 and the lens optic axis, OA. With the polygonal mirror structure 19 rotating in a direction shown by the curved arrow, the writing beam will scan the photographic plate 12 in a direction shown by the straight arrow. It can be shown that, at a constant angular velocity of rotation of the polygonal mirror, the linear velocity of scan of writing beam will be constant if the scanning lens 18 has a focal length *F.L.* that varies with $\theta$ in accordance with the relationship $$F.L.=\theta/\tan\theta \qquad (1)$$

where $k$ is a constant. Many alternative lens structure designs, all within the ordinary skill of a worker in the art, may be used to comply with the condition of equation (1.)

Scanning lens 18 should either be a lens system or an optically thick lens. In either case, as is known, the focal length of the lens is defined as the distance between the lens focal plane and the lens rear nodal point. Uniform focusing can be assured by designing the optical system such that writing beam light impinging on the polygonal mirror is collimated and that the focal plane of lens 18 is coincident with the surface of photosensitive medium 12. Under these conditions, writing beam light will be uniformly focused on the flat surface of the photosensitive medium in spite of variations in distance between the reflecting mirror facet 20 and the photosensitive medium as the mirror rotates. Equation (1) implies that the location of the nodal point of the lens, not the focal surface, varies as a function of $\theta$.

Collimation of the writing beam light can conveniently be accomplished by directing the writing beam through the scanning lens prior to reflection, as shown, and focusing the writing beam to a "waist" at a plane coincident with the focal plane of the scanning lens. The light emerging from the lens 18 and directed toward the rotating mirror is then collimated and the precise vertical location of the reflecting mirror facet is relatively unimportant. This feature can also be used for properly imaging characters on the photosensitive medium. For example, if the writing beam is formed to image the letter A at a plane coincident with the focal plane of the lens and a plane extending through the photosensitive medium surface, that letter will be imaged, after reflection, on the photosensitive medium at a point determined only by the angle of the mirror facet and independent of the vertical position of the rotating mirror facet.

Referring again to FIG. 1, the writing and coding beams are most conveniently made to be of circular cross section. With sufficiently high resolution requirements, however, it is advantageous to include a cylindrical lens 39 beam in the path of coding beam 17 for reforming the coding beam such as to make it ribbon shaped. This feature is useful because, as the resolution requirements increase, the thicknesses of the code plate strips become smaller, and any structural defect in the code plate is more likely to give an incorrect coding signal output from the photodetector.

Figure 4:
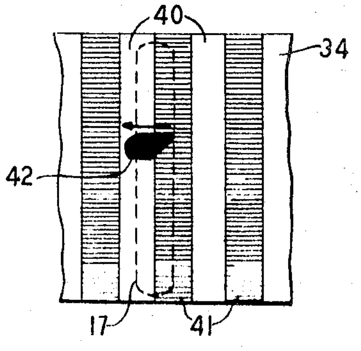
FIG. 4 is a schematic illustration of part of a code plate that may be used in the apparatus of FIG. 1.

Referring to FIG. 4 there is shown a portion of code plate 34 which comprises alternate transparent regions 40 and opaque regions 41. With an appropriate lens included in the code beam path, the coding beam 17 is ribbon-shaped, has an elongated cross section as shown, and scans the code plate as shown by the arrow. This beam configuration increases the area of impingement of the code plate and minimizes the effects of small-area defects. For example, a typical defect 42 may interfere with the desired light transmission through the code plate, but it will not result in an incorrect code signal output because its area is small with respect to the area of impingement of the coding beam; if, on the other hand, the coding beam were of circular cross section, the defect might result in an incorrect output. The appropriate design of lens 39 to produce a ribbon-shaped coding beam is within the ordinary skill of the worker in the art.

Figure 5:
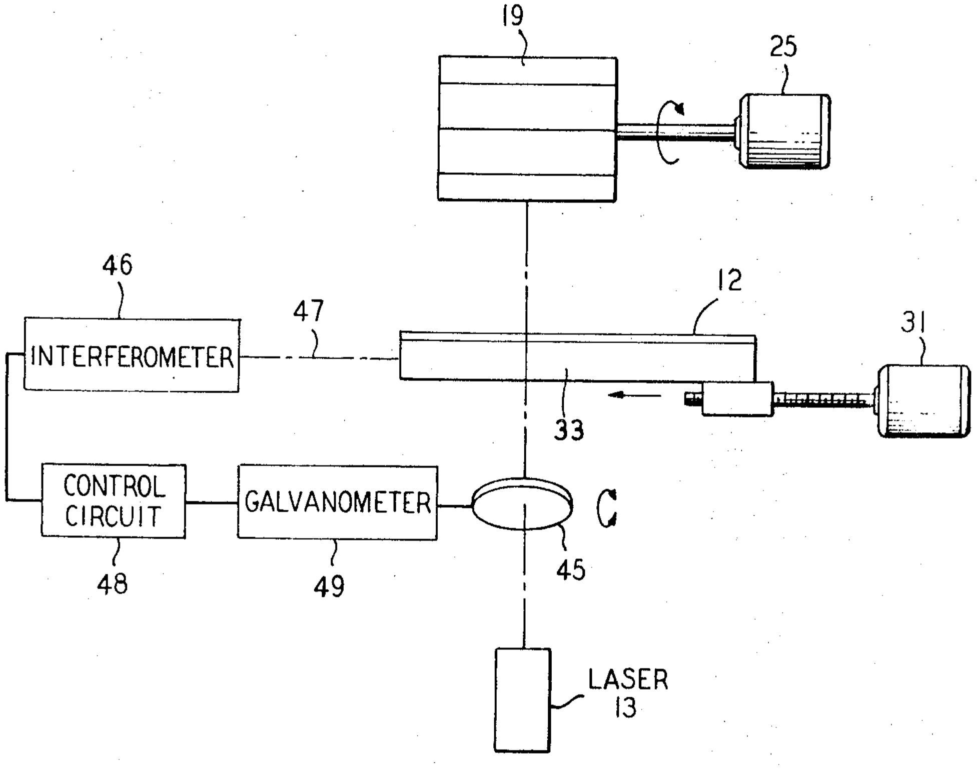
FIG. 5 is a schematic illustration of an interferometer servomechanism unit that may be used in the apparatus of FIG. 1.

FIG. 5 illustrates how a refracting plate 45 can be incorporated in the apparatus of FIG. 1 to compensate for spurious deviations in the advancement of the photographic plate 12 by the motor 31. The periodic advancement of the table 33 supporting photographic plate 12 is detected by an interferometer 46 which reflects, in a known manner, a light beam 47 from the moving table. The interferometer generates a signal indicative of the distance the table has moved, which is transmitted to a control circuit 48 that generates a voltage in response to any deviations. If the table has overshot its desired location, a voltage of one polarity is generated, while if it has not moved sufficiently far, a voltage of the opposite polarity is generated, the voltage amplitude in either case being a function of the extent of deviation. The control voltage actuates a galvanometer 49 which rotates refracting plate 45 in one direction or another depending upon the polarity of the voltage received. If there has been no deviation, no control signal is generated, the refracting plate is not rotated, and the writing beam 16 is unaffected. When a control signal is generated, the rotated refracting plate 45 deflects the writing beam 16 in one direction or the other to compensate for the mislocation of the photographic plate 12.

Interferometers capable of performing the functions described are commercially available and will therefore not be described in detail. Basically, the reflected beam 47 interferes with a reference beam to produce an interference fringe each time the path length of beam 47 changes by a half wavelength. By inducing a phase shift between the two beams, and comparing phase differences, the interferometer is also capable of detecting and indicating whether the path length of beam 47 has become shorter or longer. For example, if it is desired that the table moves to the left by 7 microns, the path length of beam 47 would be reduced by approximately 14 wavelengths. As such, if all went well, the interferometer would detect or count 28 successive fringes, which, in turn, would be detected by the control circuit 48 as being the proper number, and no control signal would be transmitted to the galvanometer. If, on the other hand, 30 fringes were counted, a control signal would be generated and the writing beam would be deflected accordingly. If the table oscillates temporarily about its desired position, the control voltage will likewise oscillate to give compensatory deflection of the writing beam. An interferometer commercially available from the Perkin-Elmer Company as the INF-1 interferometer is capable of performing the functions described. This particular interferometer is designed to generate four pulses or counts per fringe, or eight counts per wavelength.

An interferometer counter of the type described is especially suitable for controlling continuous movement of the photographic plate if so desired. The motor 31 may be a narrow band slow speed servomotor which is controlled by the output of control circuit 48. In addition to driving the refracting plate 45, the control signal then also controls the speed of the motor 31 to give a uniform continuous advancement of the table. The continuous, rather than stepped, advancement of the photographic plate results in a writing beam scan that is more akin to raster scanning of conventional television and facsimile.

It is, of course, important that the polygonal mirror structure be made with precision and that eccentricities of rotation or "wobble" be avoided so that the writing beam 16 is precisely projected through writing slit 26 during each scan. Experience has shown that this structure may be best made by forming all of the mirror facets 20 on a single piece of fused silica. Any such technique has the disadvantage, however, that if only one of the mirror facets is imperfect, the entire structure may be unusable.

Figure 6:
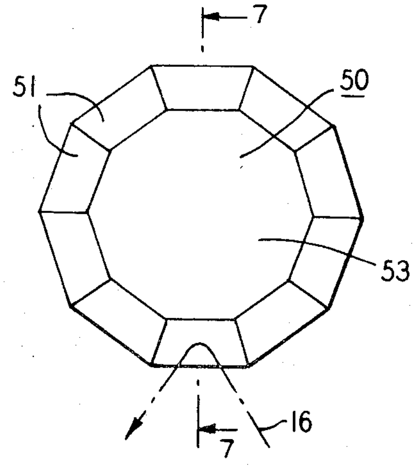
FIGS. 6 and 7 are schematic illustrations of a roof reflector prism structure that may be substituted for the planar mirror facets of the apparatus of FIG. 1.
Figure 7:
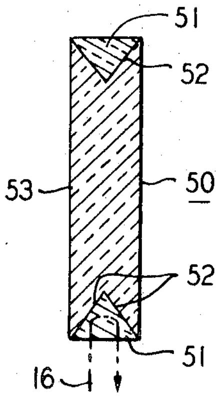

FIGS. 6 and 7 show an alternative polygonal mirror structure 50 comprising a plurality of roof reflector prisms 51. Each prism comprises reflecting surfaces 52 arranged at right angles such that incoming light 16 is reflected from both surfaces as indicated schematically. The polygonal mirror structure 50 performs the same function as the mirror structure 19 of FIG. 1; that is, as it rotates, it reflects both writing and coding beams such that they scan linearly.

The structure of FIGS. 6 and 7, however, has the advantage that each prism 51 may be fabricated independently, and if any intolerable defects occur, only a single prism is discarded, rather than the entire polygonal mirror structure. The various prisms may then be mounted on a common substrate 53, and it can be shown that the tolerance of the prisms to misalignment is larger than that of planar mirror facets. Moreover, it can be shown that the prism structure is capable of tolerating larger rotational deviations or "wobble" in certain directions than the multifaceted planar mirror structure of FIG. 1. The criterion of equation (1) is valid when roof reflectors are used.

The embodiments described are intended only to be illustrative of the invention. Although the pattern generating apparatus described is responsive to digital signals, it could also be responsive to store analog signals of the type normally used in facsimile reproduction. The control circuit 22 of FIG. 1 would then be designed such that each coding beam pulse of curve 37, shown in FIG. 2A, would release an increment of the analogue voltage signal rather than a single information pulse. While the coding beam is shown as being reflected from the same mirror facet as the writing beam, it could be designed to be reflected from a different part of the mirror structure. A rotatable mirror could, of course, be substituted for the refracting plate 45 of FIG. 5. Various other embodiments and modifications may be made by those skilled in the art without departing from the spirit and scope of the invention.

We claim:

1. In reproduction apparatus of the type comprising means for generating a writing light beam, means for modulating the beam, a medium sensitive to the beam and to modulations thereof, means for causing the beam to scan the sensitive medium, and means for controlling the modulation of the beam with respect to the scanning rate comprising means for generating a coding light beam, means for causing the coding beam to scan a code plate in synchronism with the writing beam, and coding beam responsive means adapted to release code signals in response to light transmission through the code plate, the improvement wherein:

the coding beam impinging on the code plate is in the shaped of a ribbon having a width many times greater than its thickness;

and the alternately transparent and opaque regions are in the form of very thin strips each substantially parallel to the plane of the coding beam and having a length many times greater than its thickness, whereby local defects in any transparent region obscures transmission of only a small part of the ribbon-shaped coding beam.

2. In reproduction apparatus of the type comprising means for generating a light beam, means for modulating the light beam, a photosensitive medium, and means for causing the modulated light beam to scan the photosensitive medium comprising a rotating member having a plurality of reflecting surfaces that revolve about a central axis and successively intercept and reflect the light beam, the improvement comprising:

means for causing the beam to scan the photosensitive medium at substantially a constant linear velocity with substantially constant focusing comprising a scanning lens between the rotating member and the photosensitive medium having a focal length *F.L.* that substantially conforms to the relationship $$F.L.=\theta/\tan\theta.$$

where $k$ is a constant and $\theta$ is the angle between the reflected writing beam and the optic axis of the scanning lens.

3. In apparatus of the type comprising a photosensitive medium, means for producing a light beam, means for causing the light beam to scan the photosensitive medium, means for modulating the light beam so as to print information on the medium, the scanning means comprising an array of reflecting surfaces that revolve at a substantially constant velocity about a central axis, the light beam being reflected from successive surfaces at a constantly changing angle of reflection to produce said scanning, the improvement comprising:

means for causing the light beam to scan the photosensitive medium at substantially a constant linear velocity comprising a scanning lens located between the reflecting array and the photosensitive medium in the path of the reflected beam;

the focal length F.L. of the scanning lens substantially conforming to the relationship $$F.L.=k\theta/\tan\theta$$

where $k$ is a constant and $\theta$ is the angle between the reflected light beam and the scanning lens focal axis.

4. The improvement of claim 3 wherein: the light beam, as it impinges on successive reflecting surfaces is substantially collimated, whereby the distance between a reflecting surface and the scanning lens has substantially no effect on the nature of light impinging on the photosensitive medium.

5. The improvement of claim 18 wherein: the focal plane of the scanning lens is substantially coincident with the plane of the photosensitive medium.

6. The improvement of claim 5 further comprising: means for focusing the beam to a waist at a plane substantially coincident with the focal plane of the scanning lens before the beam is directed through the scanning lens to a reflecting surface, whereby the light beam emerges from the scanning lens in a substantially collimated condition.

7. In reproduction apparatus of the type comprising means for generating a light beam, means for modulating the light beam, a photosensitive medium, and means for causing the modulated light beam to scan the photosensitive medium comprising a rotating member having a plurality of reflecting surfaces that revolve about a central axis and successively intercept and reflect the light beam, the improvement wherein:

the rotating member comprises a plurality of roof reflector prisms;

each prism comprising two reflecting surfaces arranged at right angles; and the prisms being arranged such that lines bisecting the ri angles of the prisms all substantially cross at the cent... axis.

8. Pattern generating apparatus comprising:

means for producing a writing light beam and a coding light beam;

means for simultaneously deflecting the writing and coding beams in a scanning sequence;

said deflecting means comprising a plurality of roof reflecting prisms arranged about the periphery of a member which rotates on a central axis;

means for projecting the coding and writing beams toward the prisms such that the deflection and scanning sequence of the writing and coding beams are in substantial synchronism;

means for causing the deflected writing beam to scan a photosensitive medium;

means comprising information storage apparatus for modulating the intensity of the writing beam with a train of signals during each scan of the writing beam; and means responsive to the scan of the coding beam for actuating the information storage apparatus to cause successive stored signal increments to modulate the writing beam.

9. Pattern generating apparatus comprising:

means for producing a writing light beam and a coding light beam;

means for simultaneously deflecting the writing and coding beams in a scanning sequency;

a photosensitive medium located on a support member;

means for causing the deflected light beam to scan the photosensitive medium comprising means for moving the support member with respect to the writing beam;

means comprising information storage apparatus for modulating the intensity of the writing beam with a train of signals during each scan of the writing beam;

means responsive to the scan of the coding beam for actuating the information storage apparatus to cause successive stored signal increments to modulate the writing beam;

means for measuring the movement of the support member and for generating a correctional signal indicative of any deviation of the support member from a prescribed standard;

and means for deflecting the writing beam in response to the correctional signal, thereby to compensate for spurious movement of the support member.

10. The apparatus of claim 9 wherein: the deflection means comprises an optic element in the writing beam path for deflecting the writing beam as a function of impingement angle, and a galvanometer device for rotating the optic element in response to the correction signal.

11. In reproduction apparatus of the type comprising means for generating a beam of radiant energy, means for modulating the beam, a medium sensitive to the beam and to modulations thereof, means for causing the beam to scan the sensitive medium in a first direction, and means for moving the medium in a second direction comprising a support member for the sensitive medium, the improvement comprising:

an interferometer;

said interferometer constituting means for directing a light beam toward a reflective surface of the support member, for receiving reflected light from the support member, and for generating an output signal indicative of the distance through which the support member moves;

means responsive to the output signal for generating a correctional signal indicative of any deviation of the support member from a prescribed standard; and means for deflecting the writing beam in response to the correctional signal, thereby to compensate for spurious movement of the support member.

UNITED STATES PATENT OFFICE

CERTIFICATE OF CORRECTION

Patent No. 3,573849 Dated April 6, 1971

Inventor(s) Donald R. Herriott, Kenneth M. Poole, Alfred Zacharias

It is certified that error appears in the above-identified patent and that said Letters Patent are hereby corrected as shown below:

Column 8, line 18, claim 5, the claim reference numeral "1 should read --4--.

Column 8, line 38, claim 7, the last word in the line shou read --right--.

Column 8, line 39, claim 7, the last word in the line shou read --central--.

Signed and sealed this 17th day of August 1971.

(SEAL)
Attest:

EDWARD M.FLETCHER,JR.
Attesting Officer

WILLIAM E. SCHUYLER,
Commissioner of Pater